June 23, 1931.　　P. E. KLEINEBERG　　1,811,201
BOOK COVERING MACHINE
Filed May 6, 1926
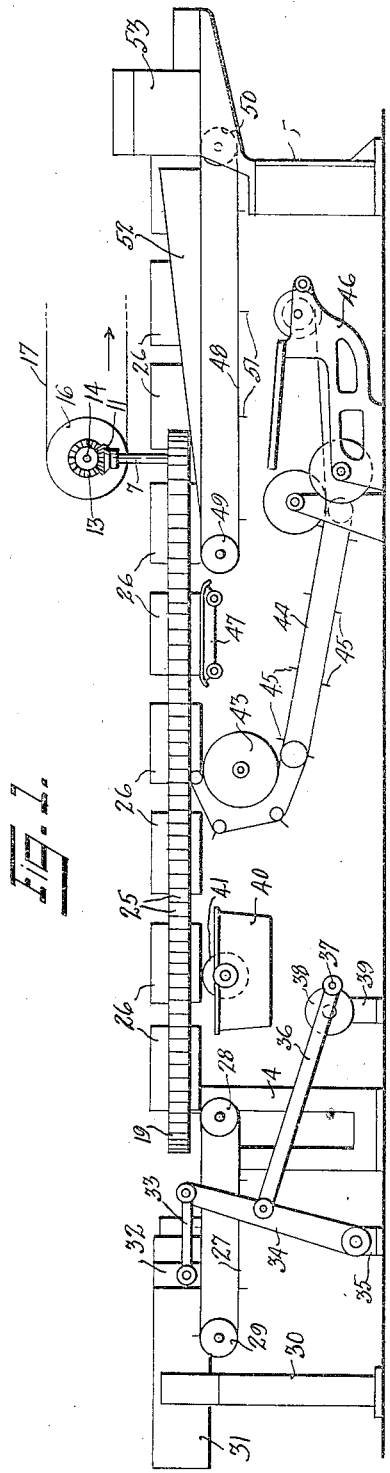
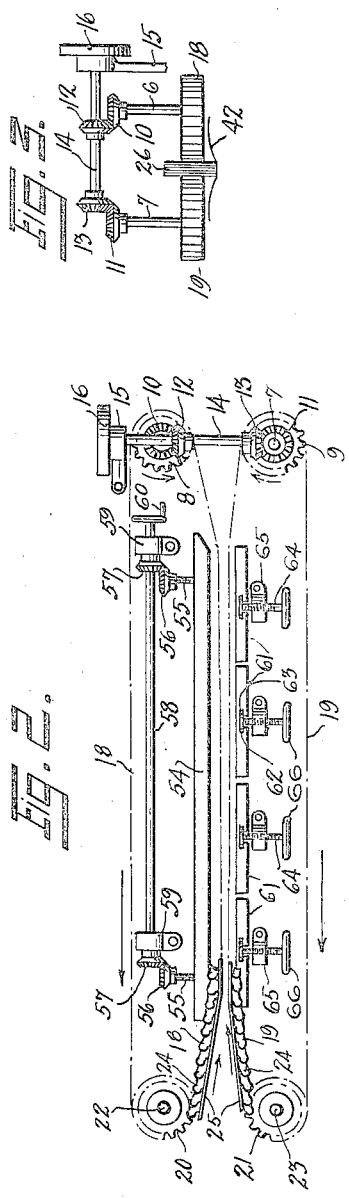
INVENTOR
Paul E. Kleineberg.
BY
ATTORNEY Patented June 23, 1931

1,811,201

UNITED STATES PATENT OFFICE

PAUL E. KLEINEBERG, OF BREWSTER, NEW YORK, ASSIGNOR TO AMERICAN ASSEMBLING MACHINE COMPANY, OF NEW YORK, N. Y., A CORPORATION OF DELAWARE

BOOK-COVERING MACHINE

Application filed May 6, 1926. Serial No. 107,054.

My invention relates more particularly to machines for applying flexible covers on books or pamphlets after they have issued from the signature gatherer or other machine such as a stitching or sewing machine.

The chief objects of my invention are, among other things, to provide a novel and simplified machine of such type in which the successive books are continuously fed into the covering machine by which the covers are applied to the backs of the separate books with the path of the successive books maintained in a substantially horizontal straight line to the end that the operation of the machine may be both automatic and continuous throughout the successive cycles thereby rendering the constant attention of the operator unnecessary. A particular feature of my invention is to dispense with the customary coacting book clamps carried by an endless chain usually employed to hold firmly the individual books in upstanding position on the carrier and to use instead a pair of endless coacting conveyor chains moving in a horizontal plane at a uniform speed whereby the books may be held clamped along their sides adjacent the backs by such conveyor chains which are maintained in predetermined lateral relationship by suitable cam-plates over which the chains travel in advancing the successive books through the machine. Another feature of my invention is to have a series of cam-plates supporting at least one of the conveyor chains, each cam-plate back of its conveyor chain being separately adjustable with respect to the opposite chain and cam-plate or plates so that the pressure applied by the chains to a book may be released at any particular zone should a book become jammed for any cause between the conveyor chains thereby necessitating the stoppage of the machine and the removal of jammed book, all without disturbing the position and clamping of the remaining books in the machine.

By my improvements the successive books or pamphlets may be readily handled and their covers applied with precision, rapidity and effectiveness, and my improved machine also lends itself to ready adjustments for books of different thicknesses. Further objects and advantages will be hereinafter described and then pointed out in the claims. The drawings show the machine in more or less diagrammatic form.

In the drawings, Fig. 1 is a side elevation of a book-covering machine showing my improvements;

Fig. 2 is a top plan view of the conveyor chains for advancing the successive books; and Fig. 3 is an end view of Fig. 2 looking from the right. Similar numerals refer to similar parts throughout the several figures.

Referring to the drawings, the standards 4 and 5 support the two drive stub-shafts 6 and 7 on which are mounted the two drive sprockets 8 and 9. The drive shafts 6 and 7 carry the bevel gears 10 and 11 respectively which mesh with the bevel gears 12 and 13 respectively mounted on the cross-shaft 14 (Figs. 2 and 3) journalled in the upright bracket 15 suitably supported on the standard 5. The shaft 14 carries the drive pulley 16 rotated by the belt 17 from any suitable source of power (not shown).

Two endless conveyor chains 18 and 19 pass around the drive sprockets 8 and 9 and are driven in the direction shown by the arrows in Fig. 2. The chains 18 and 19 lie in the same horizontal plane as shown in Fig. 3 and pass around the idler sprockets 20 and 21 respectively mounted on the upright stub-shafts 22 and 23 respectively journalled in the standard 4 at the feed end of the machine. The series of links 24 forming each conveyor chain 18 and 19 are alike in construction, and each link 24 is provided with an outwardly disposed face plate 25 which is rectangular in shape and closely abuts against the face plates of the adjacent links 24 to form in effect a continuous band of flat faced plates 25 engaging and pressing on the sides of the books 26 as shown in Figs. 1 and 3.

The books 26 are fed into the machine in upright position and with their backs lowermost by any suitable mechanism. In Fig. 1, the conveyor belt 27 passing around the pulleys 28 and 29 journalled respectively on the standards 4 and 30 advances the successive books from the feed-table 31 by the pusher 32 connected by the link 33 to the lever arm 34 pivoted to the base-bracket 35. The lever arm 34 is rocked by the crank-rod 36 connected to the wrist-pin 37 on the crank 38 journalled on the bracket 39, the crank 38 being revolved in suitably timed relation with the movement of the conveyor chains 18 and 19 by any suitable source of power (not shown).

Arranged beneath the conveyor chains 18 and 19 is the glue-pot 40 in which the glue roller 41 feeds glue from the pot 40 to the backs of the books 26 as shown in Fig. 1.

The covers 42 (Fig. 3) are fed to the cover pressed drum 43 by the endless carrier 44 having spaced apart push fingers 45 to carry the separate covers advanced from any suitable cover-feeder. In Fig. 1 I have shown a continuous feeder 46 arranged beneath the book conveyor at the delivery end of my machine. The covers 42 are advanced successively between the fingers 45 on the upper run of the carrier 44 and then around the drum 43 where they are gradually applied to the freshly-glued backs of the books 26, the drum 43 exerting a firm pressure on the covers 42 against the backs as the books 26 are progressively advanced over the drum 43.

Then the books 26 with the thereto-applied covers 42 pass to the cover breaker 47 (Fig. 1) which is moved horizontally so that when the book 26 comes opposite the breaker 47 the jaws of the breaker move inwardly to break the cover 42 in the usual manner.

The books 26 and covers 42 (Fig. 3) then pass out from between the conveyor chains 18 and 19 to the endless delivery conveyor 48 mounted on the pulleys 49 and 50 journalled in the standard 5. The conveyor 48 is also provided with push fingers 51 which carry the separate books 26 along the delivery chute 52 which transfers the covered books to the stacker 53 located at the front end of the standard 5.

The conveyor chain 18 travels over the flat cam-plate 54 (Fig. 2) which may be laterally advanced or retracted by the screw-bars 55 threaded in suitably threaded bores in the plate 54 the bars 55 being rotated by the coacting bevel-gears 56 and 57, the gears 57 being keyed to the longitudinal shaft 58 journalled in the brackets 59 and rotated by the hand-wheel 60 secured to the end of the shaft 58.

The conveyor chain 19 travels over a series of separate flat cam-plates 61 (four being shown in Fig. 2) arranged in horizontal alinement back of the chain 19 and holding same in parallelism with the chain 18 and cam-plate 54. The left-hand plate 61 has an inclined face to coact with the cam-plate 54 to form a converging path between the two chains 18 and 19 so as to grip the books 26 with a gradually increasing pressure as such books are fed into the machine. Each cam-plate 61 is provided with a T-slot 62 on its rear side into which the circular head 63 of the screw-bars 64 is fitted. The screw-bars 64 are threaded through the brackets 65 and are rotated in either direction by the hand-wheel 66 so as to advance or retract any or all of the cam-plates 61 relatively to the conveyor chain 18 and its cam-plate 54. Such separate short cam-plates 61 may be applied to either conveyor chain 18 or the chain 19 or to both to suit the requirements. In the embodiment shown I have shown the four separate cam-plates 61 as backing the conveyor chain 19 to hold same in a variably adjustable relationship in a horizontal plane with the chain 18.

In operation the books 26 are gripped between the converging paths of the conveyor chains 18 and 19 as such books pass from the conveyor belt 27 (Figs. 1 and 2) which chains hold the books in upright position firmly with the flat face plates 25 bearing against the sides of the books 26 (Figs. 1 and 3). The chains 18 and 19 then carry the books 26 at a uniform speed through the successive operating devices for applying the covers 42, and then transfer the books and covers (Fig. 3) to the delivery conveyor 48 and delivery chute 52 to be deposited in the stacker 53 during which onward movement through the machine the books 26 travel in an upright position and in a horizontal straight line path (Fig. 1). The pressure of the conveyor chains 18 and 19 may be varied for different thicknesses and weights of books by adjusting the relative positions of either the cam-plate 54 or the series of cam-plates 61 or both together. Should an individual book 26 become jammed between the conveyor chains 18 and 19 for any reason, it is only necessary to retract the particular cam-plate 61 opposite the jammed book and remove same from between the conveyor chains 18 and 19 without disturbing any of the books 26 ahead or behind which are held by the conveyor chains.

Many changes or modifications may be made in the structural details of my improved machine without departing from the principles and scope of my invention, and without sacrificing its chief advantages as a simplified book-covering machine embodying various novel devices for handling books in upright position when applying covers thereto.

I claim as my invention:

1. A book conveyor comprising two coacting endless conveyors travelling in a horizontal plane each having a series of abutting face plates squared and arranged to provide direct-contacting, continuous bands disposed in vertical parallelism to engage opposite sides of the books held vertically therebetween, and a series of flat cam-plates over which said conveyors travel continuously throughout their book-engaging runs, said plates being disposed in parallel extended relation and also separately adjustable in spaced relationship with one another.

2. A book conveyor comprising two coacting endless conveyors travelling in a horizontal plane each having a series of abutting face plates squared and arranged to provide direct-contacting, continuous bands disposed in vertical parallelism to engage opposite sides of the books held vertically therebetween, and a series of flat cam-plates relatively movable to one another over which said conveyors travel continuously throughout their book-engaging runs, said plates being disposed in parallel extended relation and also separately adjustable in spaced relationship with one another.

3. A book conveyor comprising two coacting endless conveyors travelling in a horizontal plane each having a series of abutting face plates squared and arranged to provide direct-contacting, continuous bands disposed in vertical parallelism to engage opposite sides of the books held vertically therebetween, a series of flat cam-plates over which said conveyors travel continuously throughout their book-engaging runs, said plates being disposed in parallel extended relation and also separately adjustable in spaced relationship with one another, and means for moving any of said cam-plates relatively to the others.

4. A book conveyor comprising two coacting endless conveyors travelling in a horizontal plane each having a series of abutting face plates squared and arranged to provide direct-contacting, continuous bands disposed in vertical parallelism to engage opposite sides of the books held vertically therebetween, a series of flat cam-plates over which said conveyors travel continuously throughout their book-engaging runs, said plates being disposed in parallel extended relation and also separately adjustable in spaced relationship with one another, and means for advancing or retracing any of said cam-plates relatively to the others.

5. A book conveyor comprising two coacting endless conveyors travelling in a horizontal plane each having a series of abutting face plates squared and arranged to provide direct-contacting, continuous bands disposed in vertical parallelism to engage opposite sides of the books held vertically therebetween, a series of flat cam-plates over which said conveyors travel continuously throughout their book-engaging runs, said plates being disposed in parallel extended relation and also separately adjustable in spaced relationship with one another, and means for advancing or retracting any of said cam-plates relatively to the others while the machine is in operation.

6. A book conveyor comprising two coacting endless positively-driven conveyors travelling in a horizontal plane each having a series of abutting face plates squared and arranged to provide direct-contacting, continuous bands disposed in vertical parallelism to engage opposite sides of the books held vertically therebetween, a horizontally adjustable flat cam-plate over which one of said conveyors travels, and a series of spaced-apart flat cam-plates over which the other conveyor travels throughout its book-engaging run, said last-mentioned plates comprising said series being disposed in parallel extended relation and also separately adjustable in spaced relationship with one another.

7. A book conveyor comprising two coacting endless, positively-driven conveyors travelling in a horizontal plane, each having a series of abutting face plates squared and arranged to provide direct-contacting, continuous bands disposed in vertical parallelism to engage opposite sides of the books held vertically therebetween, a horizontally adjustable flat cam-plate over which one of said conveyors travels throughout its book-engaging run, and a series of spaced-apart flat cam-plates separately movable relatively to each other over which the other conveyor travels, said last-mentioned plates comprising said series being disposed in parallel extended relation and also separately adjustable in spaced relationship with one another.

8. A book conveyor comprising two coacting endless positively-driven conveyors travelling in a horizontal plane, each having a series of abutting face plates squared and arranged to provide direct-contacting, continuous bands disposed in vertical parallelism to engage opposite sides of the books held vertically therebetween, a horizontally adjustable flat cam-plate over which one of said conveyors travels throughout its book-engaging run, a series of spaced-apart flat cam-plates over which the other conveyor travels, said last-mentioned plates comprising said series being disposed in parallel extended relation and also separately adjustable in spaced relationship with one another, and means for moving in either direction any of said series of cam-plates relatively to the others.

9. A book conveyor comprising two coacting endless positively-driven conveyors, travelling in a horizontal plane, each having a series of abutting face plates squared and arranged to provide direct-contacting, continuous bands disposed in vertical parallelism to engage opposite sides of the books held vertically therebetween, a horizontally adjustable flat cam-plate over which one of said conveyors travels throughout its book-engaging run, a series of spaced-apart flat cam-plates over which the other conveyor travels, said last-mentioned plates comprising said series being disposed in parallel extended relation and also separately adjustable in spaced relationship with one another, and means for moving in either direction any of said series of cam-plates relatively to the others while the machine is in operation.

PAUL E. KLEINEBERG.